United States Patent
Brunard et al.

(10) Patent No.: US 9,243,744 B2
(45) Date of Patent: Jan. 26, 2016

(54) RETRACTABLE CONTAINER SUPPORT AND A VEHICLE CONTAINING THE RETRACTABLE CONTAINER SUPPORT

(71) Applicant: Faurecia Interieur Industrie, Nanterre (FR)

(72) Inventors: Christophe Brunard, Bois Colombes (FR); Joep Bijlholt, Wissembourg (FR)

(73) Assignee: Faurecia Interieur Industrie, Nanterre (FR)

( * ) Notice: Subject to any disclaimer, the term of this patent is extended or adjusted under 35 U.S.C. 154(b) by 102 days.

(21) Appl. No.: 14/036,609

(22) Filed: Sep. 25, 2013

(65) Prior Publication Data
US 2014/0084116 A1 Mar. 27, 2014

(30) Foreign Application Priority Data

Sep. 27, 2012 (FR) ..................................... 12 59128

(51) Int. Cl.
*F16M 13/02* (2006.01)
*B60N 3/10* (2006.01)
*A47G 23/02* (2006.01)

(52) U.S. Cl.
CPC ........... *F16M 13/02* (2013.01); *A47G 23/0208* (2013.01); *B60N 3/102* (2013.01)

(58) Field of Classification Search
CPC . Y10S 224/926; A47G 23/0208; B60N 3/102
See application file for complete search history.

(56) References Cited

U.S. PATENT DOCUMENTS

| | | | | |
|---|---|---|---|---|
| 4,511,072 A | * | 4/1985 | Owens | 224/549 |
| 4,583,707 A | * | 4/1986 | Anderson | 248/292.13 |
| D328,730 S | * | 8/1992 | Kapp | D12/419 |
| 5,342,009 A | | 8/1994 | Lehner | |
| 5,379,978 A | * | 1/1995 | Patel et al. | 248/311.2 |
| 6,474,611 B1 | * | 11/2002 | Deaton | 248/311.2 |
| 2001/0028207 A1 | * | 10/2001 | Hoshi | 312/276 |
| 2002/0008415 A1 | * | 1/2002 | Bollaender et al. | 297/188.17 |
| 2003/0155476 A1 | * | 8/2003 | Nakaya | 248/311.2 |
| 2005/0269471 A1 | | 12/2005 | Wagner | |
| 2006/0113311 A1 | * | 6/2006 | Miyashita | 220/737 |
| 2007/0295875 A1 | * | 12/2007 | Haddad et al. | 248/311.2 |
| 2009/0039095 A1 | | 2/2009 | Ogura | |
| 2009/0146444 A1 | * | 6/2009 | Ichimaru | 296/37.8 |

FOREIGN PATENT DOCUMENTS

DE 20216674 U1 3/2003
DE 202005004258 U1 5/2005
(Continued)

OTHER PUBLICATIONS

Search Report for French application No. FR 12 59128, dated Jun. 21, 2013, 2 pages.
(Continued)

*Primary Examiner* — Gary Hoge
(74) *Attorney, Agent, or Firm* — Reising Ethingon P.C.

(57) ABSTRACT

A container support for holding a container has a lower base and upper holding member. The base receives the container which bears on the base in a bearing direction. The holding member has an opening for receiving the container. The holding member is connected to the base by a connecting mechanism configured such that the holding member is movable relative to the base in translation along the bearing direction.

18 Claims, 4 Drawing Sheets

(56) References Cited

FOREIGN PATENT DOCUMENTS

| | | | |
|---|---|---|---|
| DE | 10102008046813 A1 | 3/2010 | |
| EP | 1754625 A2 | 2/2007 | |
| FR | 2932432 A3 | 12/2009 | |
| WO | WO2011035824 | 3/2011 | |

OTHER PUBLICATIONS

Written Opinion for French application No. FR 12 59128, dated Jun. 21, 2013, 3 pages (in French only).

\* cited by examiner

RETRACTABLE CONTAINER SUPPORT AND A VEHICLE CONTAINING THE RETRACTABLE CONTAINER SUPPORT

TECHNICAL FIELD

The present invention relates to a retractable container support, in particular to support a container containing a beverage, such as a cup, glass or can.

BACKGROUND

Such container supports are positioned in motor vehicles to allow passengers to set down beverage containers, while preventing those containers from falling due to the movements of the vehicle.

Container supports are retractable for aesthetic reasons or to prevent them from being accidentally damaged when they are not in use.

U.S. Pat. No. 5,342,009 discloses a retractable container support comprising a base for receiving the bottom of a container and a holding member to hold an upper part of the container received on the base, the base and the holding member being rotatably mounted on a fastening panel and connected by at least one articulated arm such that the movement of the base relative to the fastening panel causes the movement of the holding member relative to the fastening panel.

WO 2011/035824 discloses a retractable container support comprising a base for receiving the bottom of the container and a holding member to hold an upper part of the container placed on the base, the base and the holding member being connected by an arm connected to each of the base and the holding member by a pivot connection.

One of the aims of the invention is to propose a retractable container support that is simple, cost-effective, robust and easy to use.

SUMMARY

To that end, the invention relates to a container support comprising a base for receiving a container bearing on the base in a bearing direction and a holding member to hold the container, the holding member having an opening for receiving the container, characterized in that the holding member is connected to the base by a connecting mechanism configured such that the holding member is movable relative to the base in translation along the bearing direction.

According to other embodiments, the container support comprises one or more of the following features, considered alone or according to any technically possible combinations:
  the connecting mechanism comprises at least one arm connecting the base to the holding member, each arm being connected to the base by a first connection and to the holding member by a second connection, at least one of the first connection and the second connection being a pivot and slide connection;
  the connecting mechanism comprises two arms;
  the two arms are arranged to pivot relative to the base in opposite directions during the translation of the holding member relative to the base along the bearing direction;
  at least one arm connected to the base by a first connection that is a pivot connection and connected to the holding member by a second connection that is a pivot and slide connection;
  each arm is connected to the base by a first connection that is a pivot connection and is connected to the holding member by a second connection that is a pivot and slide connection;
  at least one arm connected to the holding member by a second connection that is a pivot connection and connected to the base by a first connection that is a pivot and slide connection;
  each arm is connected to the holding member by a second connection that is a pivot connection and connected to the base by a first connection that is a pivot and slide connection;
  the first connections have first pivot axes which are distinct and parallel and the second connections have second pivot axes which are distinct and parallel;
  the two arms pivot such that two of their ends come closer together during the movement of the holding member toward the base;
  an open configuration in which the holding member is spaced away from the base along the bearing direction and a closed configuration in which the holding member is pressed on the base, with the arms folded down on the base and received between the base and the holding member provided in the form of a plate through which the or each opening is formed;
  the connecting mechanism comprises a locking system configured to lock the holding member in at least one position, preferably in multiple positions;
  the holding member is manually movable against the locking system;
  the locking system comprises at least one locking device for snapping locking between two elements that are rotatable relative to one another;
  the connecting mechanism comprises at least one locking device for snapping locking between two elements sliding relative to one another;
  the container support comprises an open configuration in which the holding member is spaced away from the base along the bearing direction and a closed configuration in which the holding member is close to the base, in particular pressed on the base;
  the connecting mechanism is configured to close the container support under the effect of an overload applied on the holding member toward the base;
  the connecting mechanism is housed between the base and the holding member;
  the holding member is provided in the form of a plate through which the or each opening is formed.

The invention also relates to a vehicle comprising a container support as defined above.

BRIEF DESCRIPTION OF THE DRAWINGS

The invention and its advantages will be better understood upon reading the following description, provided solely as an example and done in reference to the appended drawings, in which.

DETAILED DESCRIPTION OF THE ILLUSTRATED EMBODIMENT(S)

Figure 1:
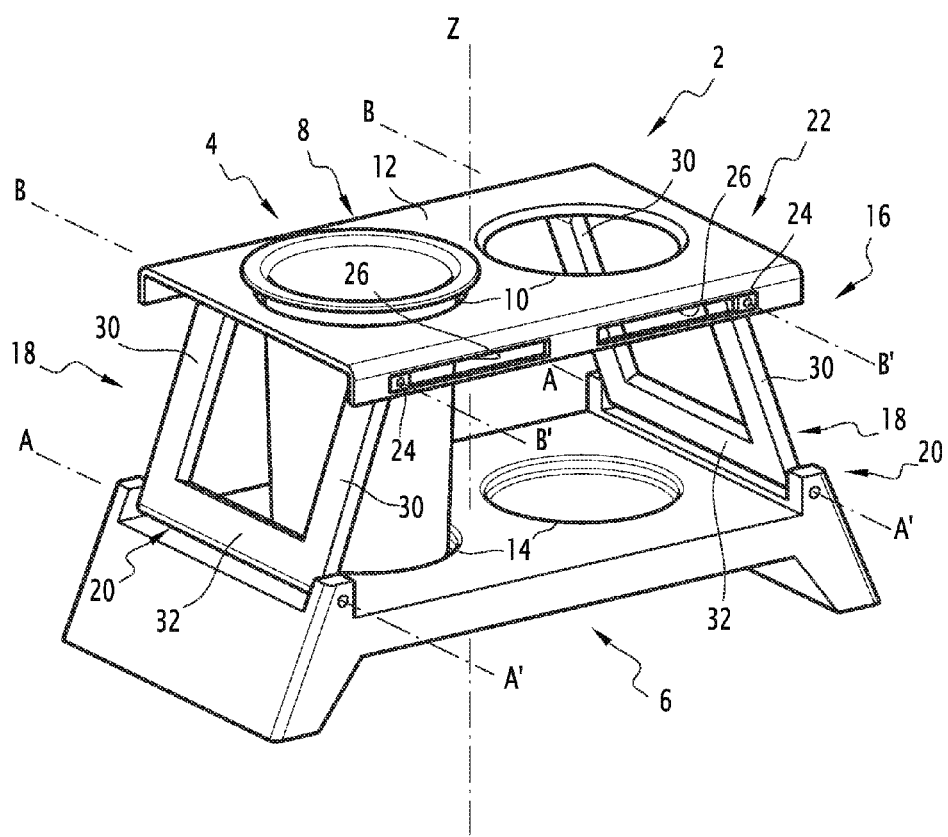
FIG. 1 is a perspective view of the container support in a deployed configuration.
Figure 2:
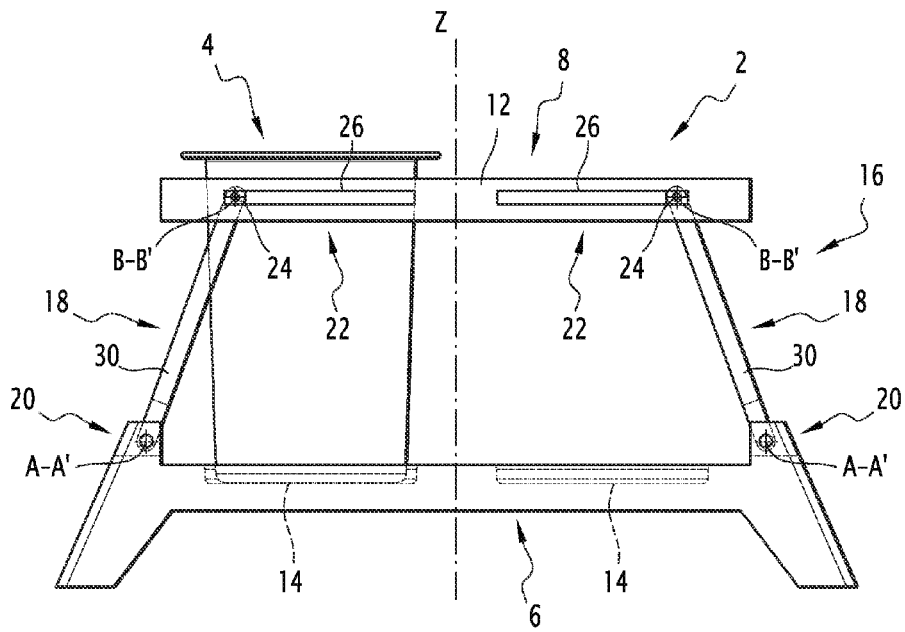
FIG. 2 is a side view of the container support in the deployed configuration.
Figure 3:
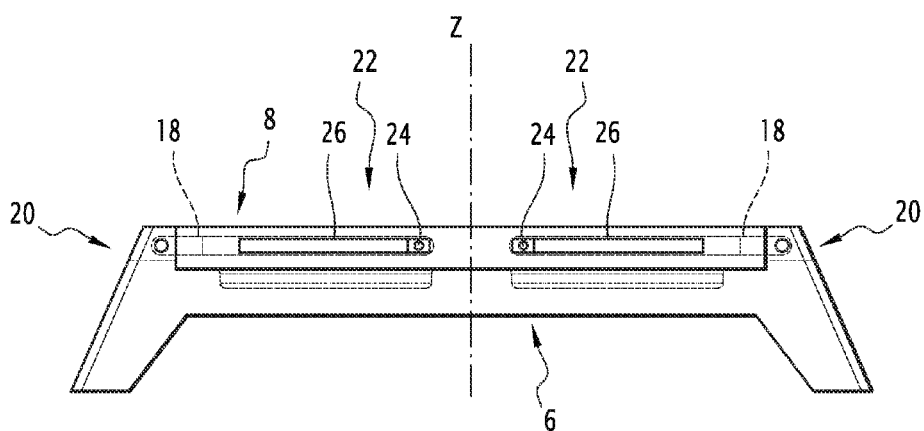
FIG. 3 is a side view of the container support in a retracted configuration.

The container support 2 of FIGS. 1 to 3 is provided to support at least one container 4. A container is for example a beverage container such as a cup or a glass or a can. The container 4 is shown here in the form of a cup for illustration purposes.

The container support 2 is for example installed in a vehicle, in particular a motor vehicle, to allow the passengers to set down a container 4 without the latter tipping over due to the movements of the vehicle.

The container support 2 comprises a base 6 for receiving a container 4 bearing on the base 6 along a substantially vertical bearing direction Z, and a holding member 8 for holding the container 4.

The holding member 8 serves to prevent tilting of the container 4 standing on the base 6. The holding member 8 holds the container 4 transversely relative to the bearing direction Z, away from the base 6 of the container 4 along the bearing direction Z.

The holding member 8 has at least one opening 10 for receiving the container so that the container 4 can be received on the base 6 through the opening 10. The holding member 8 at least partially surrounds the container 4 received on the base 6 through the opening 10.

In the illustrated example, the container support 2 is configured to support two containers side-by-side. The holding member 8 has two openings 10, each for receiving a respective container. The openings 10 are separated. Each opening 10 has a closed circular contour.

Other opening shapes are possible. Thus, in one alternative (not shown), the holding member 8 comprises two openings 10 with a partially circular contour and connected by an aperture extending between the openings.

In another alternative, the container support 2 is provided to support a single container and the holding member 8 has only one opening for receiving a container.

The holding member 8 is provided here in the form of a plate 12 through which each opening 10 is formed.

To improve the stability of the container 4, the upper face of the base 6 has a cavity 14 across from each opening 10. Each depression 14 is provided to receive the bottom of the container 4 received on the base 6.

The container support 2 has a deployed configuration (FIGS. 1 and 2) in which the holding member 8 is separated from the base 6 along the bearing direction Z. The container support 2 has a retracted configuration (FIG. 3) in which the holding member 8 is close to the base 6. In the retracted configuration, the holding member 8 is pressed against the base 6.

The holding member 8 is movably mounted on the base 6 by means of a connecting mechanism 16 making it possible to move the holding member 8 relative to the base 6 in a translational movement along the bearing direction Z.

The connecting mechanism 16 comprises two arms 18, each arm connecting the base 6 to the holding member 8.

Each arm 18 has a first end connected to the base 6 by a first articulated connection 20 having a first pivot axis A-A' and a second end connected to the holding member 8 by a second articulated connection 22 having a second pivot axis B-B'.

The pivot axes of the first connections 20 and second connections 22 are parallel to each other. In particular, the first pivot axis A-A' and the second pivot axis B-B' of each arm 18 are parallel to each other. The first pivot axes A-A' of the two arms 18 are parallel to each other. The second pivot axes B-B' of the two arms 18 are parallel to each other.

The first pivot axes A-A' are separate and/or the second pivot axes B-B' are separate.

One of the first connection 20 and the second connection 22 of each arm 18 is a pivot connection, the pivot axis of which is stationary, the other being a pivot and slide connection, the pivot axis of which is defined by at least one pivot slidingly mounted along a slit extending in a plane perpendicular to the pivot axis.

In the illustrated example, the first connection 20 of each arm 18 is a pivot connection and the second connection 22 of each arm 18 is a pivot and slide connection.

The first pivot axes A-A' are stationary. They are separate here and separated from one another. Due to the sliding, the second pivot axes B-B' are movable relative to one another.

The second connection 22 of each arm 18 comprises at least one pivot 24 provided at the second end of the arm 18 and extending along the second pivot axis B-B' of the arm 18, the pivot 24 being pivotably and slidingly received in an elongated slit 26 provided on the holding member 8.

In the illustrated example, the slits 26 extend rectilinearly in a plane perpendicular to the bearing direction Z. This makes it possible to preserve the compactness of the holding member 8, and that of the container support 2 in its entirety, along the bearing direction Z.

When the holding member 8 moves relative to the base 6, the first end of each arm 18 pivots relative to the base 6 around the first pivot axis A-A' of its first connection 20, and its second end pivots and slides relative to the holding member 8.

The movement of the connecting mechanism 16 thus allows the holding member 8 to move relative to the base 6 in translation along the bearing direction Z.

The two arms 18 are arranged so as to pivot in opposite directions during movement of the holding member 8 relative to the base 6.

In the illustrated example, during the movement of the holding member 8 toward the base 6, the arms 18 pivot such that their two ends come closer together. Conversely, during the movement of the holding member 8 away from the base 6, the arms 18 pivot such that their two ends move away from each other.

The arms 18 are arranged so as not to interfere with one another during the movement of the holding member 8 relative to the base 6.

In the illustrated example, each arm 18 has a length smaller than half of the center distance between the first axes A-A' of the two arms 18.

In the retracted configuration (FIG. 3), the arms 18 are folded down on the base 6, and are received between the base 6 and the holding member 8. The folded connecting mechanism 16 is contained between the base 6 and the holding member 8. It is thus protected. The container support 2 is compact and relatively flat in the retracted configuration.

The container holder 2 is suitable for example for being positioned on a flat surface of a vehicle, such as a floor or a tunnel, the risks of damaging the container support 2 being limited when it is in the retracted configuration.

As shown in FIG. 1, each arm 18 has two parallel branches 30 separated from each other along the direction of the pivot axes A-A', B-B' of the arm 18. The two branches 30 are rigidly connected by a bar 32 extending transversely between the two branches 30.

The second connection 22 of the arm 18 connects each branch 30 to the holding member 8. The second connection 22 has a respective pivot 24 on each branch 30, each pivot 24 being received in a respective slit 26 provided on the holding member 8. The slits 26 extend on either side of each opening 10. Thus, the branches 30 of each arm 18 slide relative to the holding member 8 while passing on either side of an opening 10, without the arm 18 interfering with a container received in the opening 10.

The connecting mechanism 16 comprises a locking system comprising at least one locking device for locking the holding member 8 in at least one position, preferably multiple positions along the bearing direction Z. The locking device is positioned so as to lock the movement of at least one arm 18 relative to the base 6 or relative to the holding member 8. The locking device is preferably a snapping locking device.

Preferably, the locking system makes it possible to immobilize the holding member in at least one intermediate position, preferably several intermediate positions, between the end position corresponding to the deployed configuration and the end position corresponding to the retracted configuration. This allows easy adaptation of the position of the holding member 8 based on the container, in particular based on the height and/or taper of the container.

Figure 4:
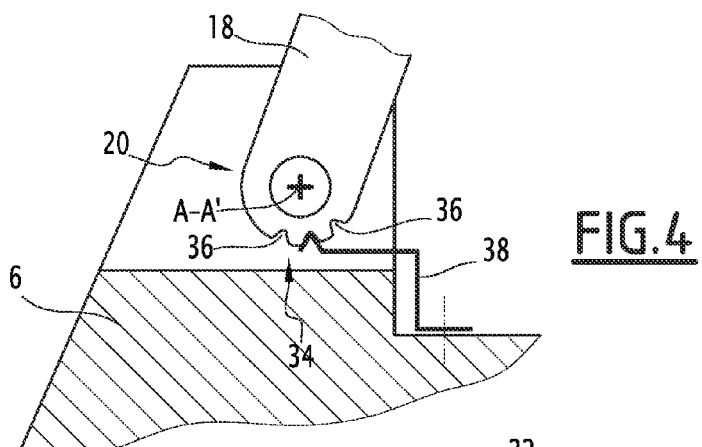
FIG. 4 is a detailed view of a pivot connection.

FIG. 4 illustrates a rotational locking device 34 for locking the rotation of an arm 18 relative to the base 6. The rotational locking device 34 operates by snapping. The rotational locking device comprises notches 36 provided on the first end of the arm 18 and an elastic member or a click 38, fixed on the base 6 and elastically deformable, provided to snap in each notch based on the angular position of the arm 18 relative to the base 6.

Figure 5:
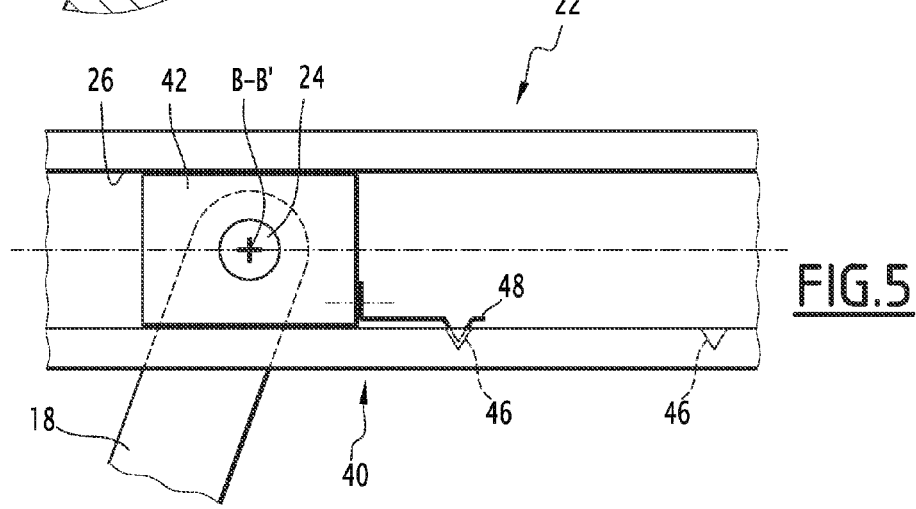
FIG. 5 is a detailed view of a pivot and slide connection.

FIG. 5 illustrates a linear locking device 40 for locking a sliding movement along a slit 26. The second connection 22 connecting a second end of the arm 18 to the holding member 8 comprises a slider 42 in which the pivot 24 is received rotating around the second pivot axis B-B', the slider 42 being slidingly received in the slit 26 along the latter part. The linear locking device 40 comprises notches 46 provided along the slit 26 and an elastic member or click 48, elastically deformable, fixed on the slider 42, so as to engage in each of the notches 46 based on the position of the pivot 24 along the slit 26.

To lock the holding member in at least one intermediate position, each rotary or linear snapping locking device has at least one notch corresponding to the or each intermediate position.

In each locking device, the notches are provided to lock the arm 18 in position while allowing the associated click to disengage from a notch under a force exceeding a predetermined threshold, to make it possible to move the holding member 8 between the retracted configuration and the deployed configuration.

In particular, the or each end notch, corresponding to an end position of the holding member 8, makes it possible to disengage the click in at least one direction of movement under a force exceeding a predetermined threshold, to move toward the other end position. The or each intermediate notch, corresponding to an intermediate locking position, is configured to allow the click to be disengaged in both directions of movement, under a force exceeding a predetermined threshold. For each notch, the threshold is identical or different for the two opposite directions of movement.

The force thresholds are chosen so as to allow a user to actuate the holding member 8 manually.

The force thresholds are chosen so as to allow the retraction of the holding member in case of involuntary bearing on the holding member 8, for example if a passenger steps on the container support in the deployed configuration.

The container support 2 comprises at least one opening device 50 to bias the holding member 8 toward the deployed configuration.

Figure 6:
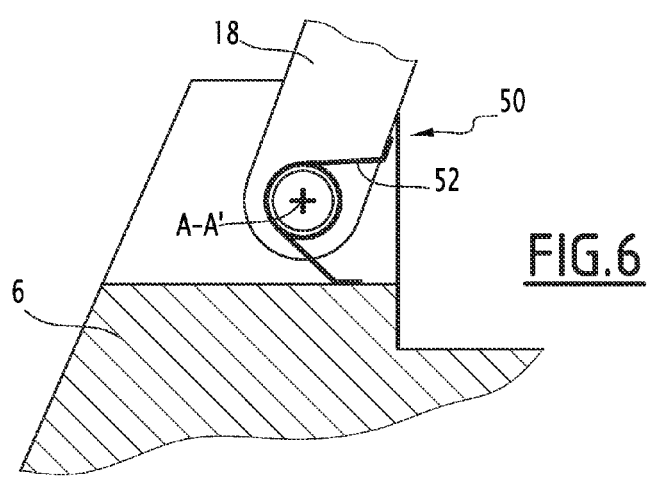
FIG. 6 is a detailed view of an opening device.

FIG. 6 illustrates an opening device 50 in the form of an elastically deformable elastic member 52, positioned between an arm 18 and the base 6 to bias the arm 18 in rotation around its first pivot axis A-A' toward the open configuration.

The elastic member 52 here is a torsion spring having one end bearing on the arm 18 and the other bearing on the base 6. The rotation of the arm 18 during the movement of the holding member 8 in the retracted configuration elastically deforms the elastic member 52, which restores the energy thus stored during the deployment of the container support 2.

Such an opening device 50 is for example positioned on only one of the arms 18 or on each arm 18.

The force resulting from the opening device 50 is below the force threshold(s) of the locking devices, to prevent involuntary opening of the container support.

The invention is not limited to the embodiment of FIGS. 1 to 3. In particular, other arrangements of the arms and their connections to the base and the holding member may be considered.

Figure 7:
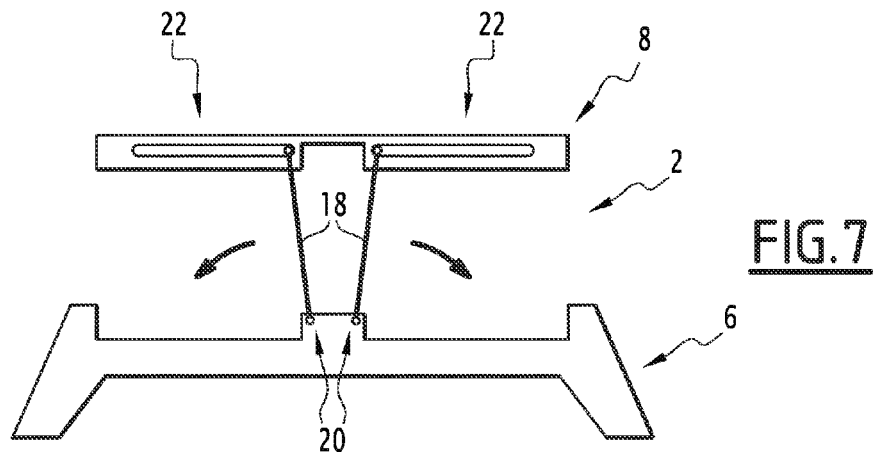
FIGS. 7 to 9 are side views of container supports in the deployed configuration according to alternatives.

In the alternative illustrated in FIG. 7, the second ends of the arms are adjacent and the first ends of the arms 18 separate from each other during the movement of the holding member 8 toward the base 6.

Figure 8:
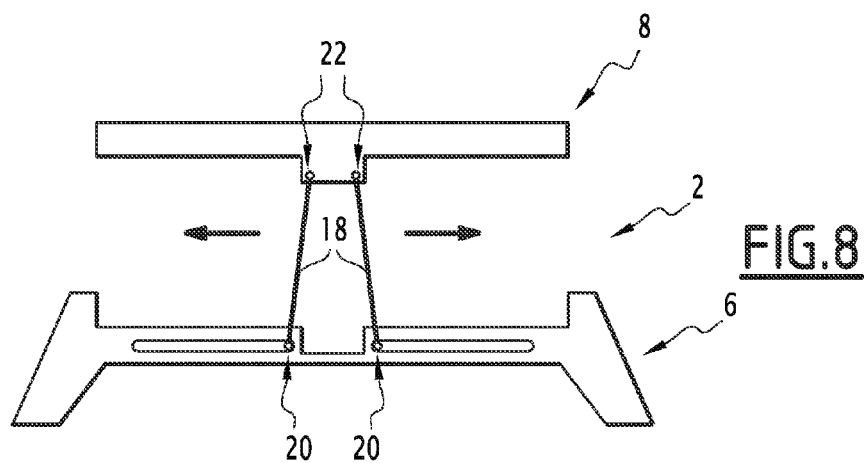

In the alternative illustrated in FIG. 8, the first connections are pivot and slide connections and the second connections are pivot connections.

Figure 9:
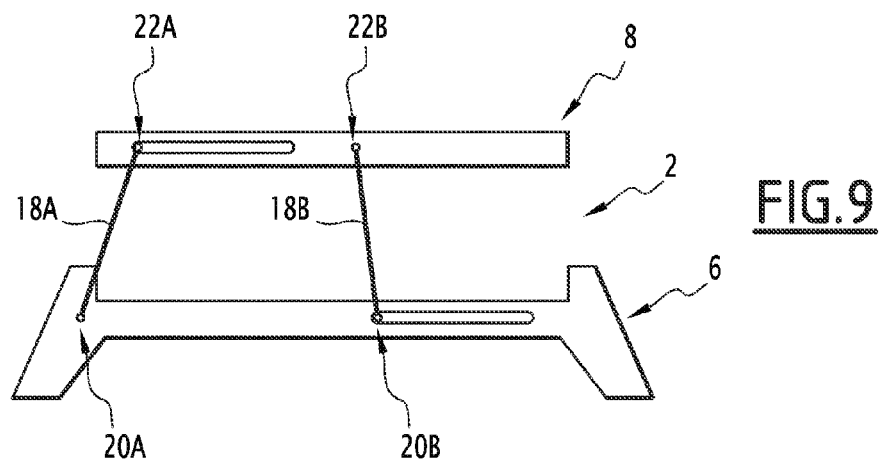

In the alternative illustrated in FIG. 9, the arms 18 are in inverse configurations: for one arm 18A, the first connection 20A is a pivot connection and the second connection 22A is a pivot and slide connection, and for the other arm 18B, the first connection 20B is a pivot and slide connection and the second connection 22B is a pivot connection.

Owing to the invention, the container support 2 is simple, easy to produce, robust, and easy to use. The number of parts of the connecting mechanism is reduced.

The container support 2 deploys easily by simply pulling the holding member upward. The container support 2 is manually deployable against the locking system. It allows the holding member to be locked in different positions, in particular in intermediate positions based on the container.

The container support 2 is manually retractable against the locking system. It retracts in case of unintentional force applied on the holding member. Since the holding member 8 retracts through a substantially vertical translational movement, the container support 2, placed on a floor or an area where a passenger may inadvertently place his foot, may retract in such a case.

In the retracted position, the container support 2 has a compact, relatively flat and thin shape, the connecting mechanism being housed between the holding member and the base and protected by them.

The invention claimed is:

1. A container support comprising a base for receiving a container that bears on the base in a bearing direction and a holding member to hold the container, the holding member having an opening for receiving the container, wherein the holding member is connected to the base by a connection mechanism configured such that the holding member is movable relative to the base in translation along the bearing direction;

wherein the connection mechanism comprises two arms connecting the base to the holding member, each arm being connected to the base by a first connection that is a pivot connection and to the holding member by a second connection that is a pivot and slide connection; and wherein the two arms are arranged to pivot relative to the base in opposite directions during the translation of the holding member relative to the base along the bearing direction.

2. The container support according to claim 1, wherein the first connections have first pivot axes which are distinct and parallel and the second connections have second pivot axes which are distinct and parallel.

3. The container support according to claim 1, wherein the two arms each have an end connected to the holding member, and wherein said ends come closer together during movement of the holding member toward the base.

4. The container support according to claim 1, comprising an open configuration in which the holding member is spaced away from the base along the bearing direction and a closed configuration in which the holding member is pressed on the base, with the arms folded down on the base and received between the base and the holding member.

5. The container support according to claim 1, wherein the connection mechanism comprises a locking system configured to lock the holding member in at least one position.

6. The container support according to claim 5, wherein the holding member is manually movable against the locking system.

7. The container support according to claim 6, wherein the locking system comprises at least one locking device for snapping locking between two elements that are rotatable relative to one another.

8. The container support according to claim 6, wherein the connection mechanism comprises at least one locking device for snapping locking between two elements sliding relative to one another.

9. The container support according to claim 1, wherein the holding member is provided in the form of a plate through which the or each opening is formed.

10. A vehicle comprising a container support according to claim 1.

11. The container support according to claim 1, wherein the two arms each have an end connected to the holding member, and wherein said ends separate away from each other during movement of the holding member toward the base.

12. A container support comprising a base for receiving a container that bears on the base in a bearing direction and a holding member to hold the container, the holding member having an opening for receiving the container, wherein the holding member is connected to the base by a connection mechanism configured such that the holding member is movable relative to the base in translation along the bearing direction;

wherein the connection mechanism comprises two arms connecting the base to the holding member, the two arms being arranged to pivot relative to the base in opposite directions during the translation of the holding member relative to the base along the bearing direction; and wherein each arm is connected to the holding member by a second connection that is a pivot connection and connected to the base by a first connection that is a pivot and slide connection.

13. The container support according to claim 12, comprising an open configuration in which the holding member is spaced away from the base along the bearing direction and a closed configuration in which the holding member is pressed on the base.

14. The container support according to claim 13, wherein the connection mechanism is configured to close the container support under the effect of an overload applied on the holding member toward the base.

15. The container support according to claim 13, wherein, in the closed configuration, the connection mechanism is housed between the base and the holding member.

16. The container support according to claim 12, wherein the two arms each have an end connected to the base, and wherein said ends separate away from each other during movement of the holding member toward the base.

17. A container support comprising a base for receiving a container that bears on the base in a bearing direction and a holding member to hold the container, the holding member having an opening for receiving the container, wherein the holding member is connected to the base by a connection mechanism configured such that the holding member is movable relative to the base in translation along the bearing direction;

wherein the connection mechanism is attached to the base and holding members by respective first and second connections, wherein at least one of the first and second connections comprises at least one linear locking device for snap locking between two elements sliding relative to one another.

18. The container support according to claim 17, wherein the at least one connection comprises a slider which is slidably received in a slit and wherein the at least one linear locking device comprises one or more notches in the slit and a click fixed on the slider.

* * * * *